UNITED STATES PATENT OFFICE.

ADOLPHE ROCK, OF PARRAL, ESTADO DE CHIHUAHUA, MEXICO.

REFINING OIL, &c.

SPECIFICATION forming part of Letters Patent No. 316,663, dated April 28, 1885.

Application filed December 13, 1884. (No specimens.)

*To all whom it may concern:*

Be it known that I, ADOLPHE ROCK, of Parral, Estado de Chihuahua, Mexico, have invented certain new and useful Improvements in Refining Oils and other Hydrocarbons, of which the following is a full, clear, and exact description.

My invention consists in improvements in refining various oils of animal or vegetable nature and other hydrocarbons, whether solid or semi-solid or liquid, at ordinary temperature, whereby said hydrocarbons are not only freed of any extraneous substances, coloring-matters, disagreeable taste and smell, &c., but can also be thoroughly bleached, if desired, by the same operation, and all of this is accomplished without leaving in the substance operated upon anything deleterious to health, if such substances treated are destined for food; also by certain variations of my process, which will be fully described further on, a part of stearine, margarine, and other hydrocarbons of that class, if contained in the substance operated upon, may, if so wished, be eliminated therefrom; hence the congealing-point of such oils, being considerably lowered thereby, inferior vegetable oils will thus become well adapted for lubricating and illuminating purposes, and those vegetable oils which contain no vegetable parts deleterious to health will be rendered as well adaptable and agreeable for food as the best olive-oil.

The following is a description of my process, and to make it more comprehensible I will take for illustration cotton-seed oil after it is partially refined from crude or "red" oil into "yellow" oil by means of alkalies, as is generally practiced now, and proceed with it in a manner to make of it a white oil, perfectly adaptable to any and all purposes to which best colorless, odorless, and tasteless pure oil can be adapted, and which for food is equal to the best Provence olive-oil. As a first step, I put the oil to be operated upon into a wooden tank, to which a mechanical stirrer is adapted. Any kind of a contrivance will answer. I generally use an upright wooden shaft, revolving in the center of the tank and furnished with horizontal paddles or blades fixed to it at an angle to resemble a propelling-screw and revolved in such direction that the contents of the tank are forced by it downward at the center and raised at the periphery. Having started the stirrer and the oil— say four hundred gallons in quantity—being well set in motion, I now let into it a stream about one-half inch in diameter of well-settled and thoroughly clear lime-water until one hundred gallons of it are admitted, the whole being kept in motion continually, and at the same time I let run into this tank another half-inch stream of clear water until a like quantity of this also is admitted, and keep stirring the whole until a perfectly uniform emulsion is made of it, which usually takes place in about two hours. Of course the above proportions of clear and lime water may previously be united together and then let into the oil. The effect will be the same. The lime-water for this purpose should be made fresh every time it is needed, slaking and dissolving the lime a few hours before use by stirring thoroughly, and then letting it settle until the water is perfectly clear. About two pounds of good unslaked lime to one hundred gallons of water will make a thoroughly-saturated solution and leave but little waste.

While making the above emulsion, should the contents of the tank be very thick and sluggish, as often happens when an inferior vegetable oil is operated upon, I warm it gently with a steam-coil, with which the operating-tank should be provided, taking good care that the temperature in no case exceeds 110° Fahrenheit. Well-made emulsion has the appearance of a homogeneous white mass, and when this point is attained I then add to it (keeping the stirrer still running and shutting off the steam from the steam-coil if this is used) a solution of permanganate of potash in a stream not over one-fourth of an inch in diameter, and falling at or near the center of the tank, whereby it is immediately forced downward by the stirring-screw, and thus brought at once into a more intimate contact with the oil than it would otherwise be. This solution I prepare in a tub placed above the operating-tank by putting into it a quantity of crystallized permanganate of potash in proportion of two and a half pounds of permanganate to each one hundred gallons of oil, filling the tub with water, letting it run into the tank by means of a faucet, and replenishing this tub with water every time it empties until the whole of the permanganate is dissolved with very little, if any, stirring, in order that this solution should always be somewhat below the point of saturation. The emulsion will now look speckled, with minute bright-red dots, which gradually, as the permanganate deoxidizes, will disappear. The whole of this solution of permanganate being added I let the stirring continue for from four to six hours longer, and then add to the contents of the tank, also very gradually—that is, in a stream about one-fourth inch in diameter—a solution of sulphuric acid, which solution is in proportion of one of acid to twenty of water, three pounds of acid to every one hundred gallons of oil being necessary in this case. This solution I prepare in a separate vessel lined with lead, and always taking care while making it to pour the acid into water and not the water into the acid. Hydrochloric acid instead of sulphuric acid can be used. It will now be observed that as soon as acid solution is added the mass operated upon becomes more liquid. The stirring should be continued for one or two hours longer, then stopped, and the mass left to separate. In a few hours the oil will be found completely separated and floating on the water, which water, in this case, if tested with litmus-paper, should always give a slightly-acid reaction to prove a complete neutralization of the lime. The water is drawn out now through a faucet at the bottom of the operating-tank, and the oil transferred to a settling-tank, which in winter should be kept warm by means of a steam-coil, but not to exceed 90° Fahrenheit. In from three to four days the oil will be found to be perfectly white, transparent, odorless, not liable to become speedily rancid, and for food equal in every way to the best imported olive-oil.

Yellow oil equal in every respect, color excepting, to the above white oil is made by diminishing the quantity of permanganate used to about one-half of the proportion given above.

In general the proportion as given already and will be given hereinafter depends on the amount of impurities contained in the material to be operated upon, and hence is variable; but only a short experience with any given hydrocarbon will at once indicate the proportion needed, and neither the excess nor the insufficiency of the agents indicated can result in any great loss, because, in case of insufficiency, it will only cause the trouble of repeating the operation, and in case of excess the loss will be the quantity in excess of the permanganate, the lime, and the acid, which in all cases is used only in proportion but slightly in excess of the quantity necessary to thoroughly neutralize the lime, and no more, while the loss of the material operated upon in either case would be hardly perceptible. Castor-oil can also be refined in the above manner, and rendered perfectly white, tasteless, and odorless without losing any of its medicinal properties; but it will require a longer setting and at a higher temperature, which, however, must not exceed 140° Fahrenheit.

Manganate of potash instead of permanganate may also be used, since the former is converted into the latter when dissolved in water; but its use is objectionable because of the uncertainty as to the effect it will produce, and the reaction on the oil of the residuum of the former which may take place, also the difficulty of thoroughly clarifying the oil by settling, because of the finely-subdivided residual peroxide of manganese. Other compounds rich in oxygen, and parting with it in presence of alkaline earths—such as chromic acids, bichromate of potash, &c.—can be used instead of the manganic combinations with potash. These last, however, I prefer because of their innocuousness, while the former leave in the material operated upon substances deleterious to health, such as green oxide of chromium, &c. The use and proportion of the lime-water must of course be varied according to the kind of oil used and the kind to be produced, the main object of using it being that it should in the first place combine with and free the oil of any albuminous and other nitrogenous substances it may hold in suspension; and, secondly, that it should combine with a part or whole, as the operator may desire, of stearine, margarine, &c., contained in the substances operated upon, as it will do this in preference of combining with oleine by reason of the stronger affinity to it of these solid hydrocarbons than of the more liquid ones; hence it is self-evident that if the quantity of lime added to an oil is not large enough to make a combination with the whole mass of the latter the above-mentioned solid hydrocarbons, by reason of their stronger affinity, will be the first to enter into this combination, leaving oleine free and pure to the same extent, more or less, as the quantity of lime was proportioned to the quantity of those solid hydrocarbons; but even in the preparation of the oil first herein specified, and in which all of the stearine was purposely left, the use of lime-water cannot wholly be dispensed with, because, aside from its reaction, specified already, it also assists very materially the deoxidation of the permanganate, on the thoroughness of which deoxidation the success of the operation and the saving of time and material depend. Besides this, not using lime-water would leave in the material to be refined all of the nitrogenous matter it contained, and hence the defecation of it by the permanganate above mentioned would last only a very short while, the whole becoming rancid even before it was well settled.

Other alkaline earths—such as baryta, lithia, &c.—can be used instead of lime, and with the same effect. I prefer lime, however, because of its cheapness and the facility of obtaining it.

To make a non-freezing oil, (known in trade as "winter-oil," made by artificially congealing the oil and pressing the oleine out of it while in that state,) a larger quantity of lime-water should be used, and at the end of the operation its combination with oil not neutralized with acid, as specified above, but the whole mass left to settle at a temperature of about 120° Fahrenheit. In two or three days nearly pure oleine—*i. e.*, winter-oil—can be siphoned off, leaving at the bottom of the tank a compact white mass, which, when heated and the lime now neutralized with an acid (hydrochloric acid is preferable in this case) and settled while being kept warm, will free the whole of the hydrocarbons which it held in combination.

Solid hydrocarbons—such as tallow, lard, butter, &c., especially the latter two when rancid—can be thoroughly defecated by the above process, care being taken that the whole operation is carried on at a temperature at which the fats operated upon are in a state of fluidity needed absolutely to produce the desired effect speedily and cheaply. In these last cases the lime-water should also be prepared at the same temperature to insure that there should be no precipitation of lime in the operating-tank by the rise of temperature, which precipitation would invariably take place if the lime-water, while being made, was at a lower temperature, and also that its neutralization at the end of the operation should be very complete, as otherwise the loss of margarine in butter would result in converting it into oil.

In case the material operated upon is extremely rancid—that is, in or almost in a state of putrid decomposition—hydrochloric acid for neutralizing the lime is preferable to sulphuric acid, the material, after settling, being thoroughly washed (by means of the same stirring and agitating in the operating-tank) with a light solution in water of crystallized pure hyposulphite of soda.

In purifying butter by the above means the objectionable feature is that it will be completely bleached at the same time. This defect, however, can easily be remedied by artificially coloring it again with carrotine or other innocuous substance.

Having thus described my invention, I claim as new and desire to secure by Letters Patent—

1. The herein-described process of refining oils and other hydrocarbons of a vegetable or animal nature, consisting in treating them by means of lime or other alkaline earth or earths and a body rich in oxygen and deoxidizable in presence of the above-mentioned alkali, such bodies being manganic or chromic combinations of potash, chromic acid, &c., substantially as set forth.

2. The herein-described process for separating the so-called "solids," such as stearine, margarine, &c., from the liquids such as oleine, &c., in hydrocarbons of an animal or vegetable origin, consisting in combining the said solids, either temporarily or otherwise, with lime or other alkaline earths, and separating them in that state by specific gravity, substantially as set forth.

3. The herein-described method of separating the nitrogenous matters from oils and other hydrocarbons of animal or vegetable origin by means of lime or lime-water or other alkaline earth or earths, substantially as set forth.

ADOLPHE ROCK.

Witnesses:
OSCAR F. GUNZ,
C. SEDGWICK.